United States Patent [19]
Doolittle et al.

[11] Patent Number: 5,462,146
[45] Date of Patent: Oct. 31, 1995

[54] COMMON SHIFTER AND PARKING BRAKE MOUNTING

[75] Inventors: Miles G. Doolittle, Royal Oak; Paul A. Zielesch, Clawson, both of Mich.

[73] Assignee: Dura Mechanical Components, Inc., Troy, Mich.

[21] Appl. No.: 86,319

[22] Filed: Jul. 6, 1993

[51] Int. Cl.$^6$ .................................................. B60K 20/04
[52] U.S. Cl. ........................................ 192/4 A; 74/473 R
[58] Field of Search .......................... 192/4 A; 74/473 R, 74/473 P; 180/336; 248/632, 634

[56] References Cited

U.S. PATENT DOCUMENTS

| | | | |
|---|---|---|---|
| 1,468,522 | 9/1923 | Snell et al. | |
| 1,927,646 | 9/1933 | Miller | 74/473 P X |
| 3,323,609 | 6/1967 | Rosenberger et al. | 180/336 |
| 4,515,036 | 5/1985 | Dotson | 74/535 |
| 4,545,467 | 10/1985 | Fernandez et al. | 192/4 A |
| 4,606,238 | 8/1986 | Ikemoto et al. | 74/473 R |
| 4,693,135 | 9/1987 | LaRocca et al. | 74/473 R |
| 4,711,135 | 12/1987 | Horiuchi et al. | 74/473 R |

*Primary Examiner*—Richard M. Lorence
*Attorney, Agent, or Firm*—David A. Greenlee

[57] ABSTRACT

A mounting bracket assembly is disclosed for soft mounting a transmission shifter and simultaneously hard mounting a parking actuator to a vehicle floorboard. The bracket assembly comprises an elongated base plate having mounting holes for hard mounting the base plate longitudinally of the vehicle to the floorboard. The base plate has a pair of spaced rear upstanding flanges for mounting the parking brake actuator with its operating lever extending longitudinally of the vehicle. An elevated tower structure mounts the transmission shifter and includes depending legs which include four mounting pads. Cooperating mounting pads are formed on the base plate and interfit vertically with the leg mounting pads to locate the transmission shifter on the base plate with its operating lever extending beside the parking brake actuator operating lever. Rubber pads are interposed between the leg and base plate mounting pads and are bonded to these mounting pads to secure the tower structure to the base plate and simultaneously provide a soft mounting of the shifter to the vehicle floorboard.

8 Claims, 3 Drawing Sheets

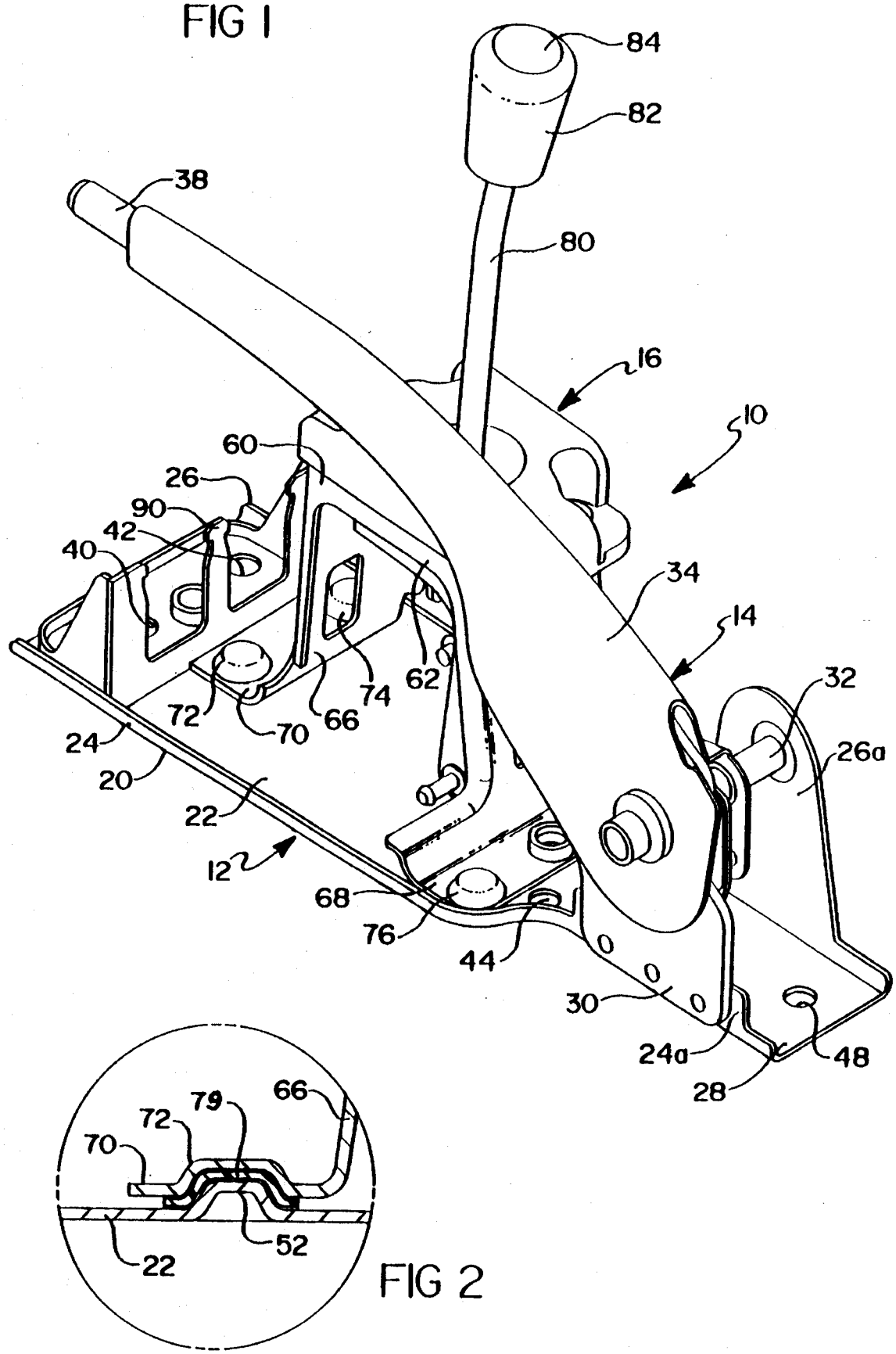

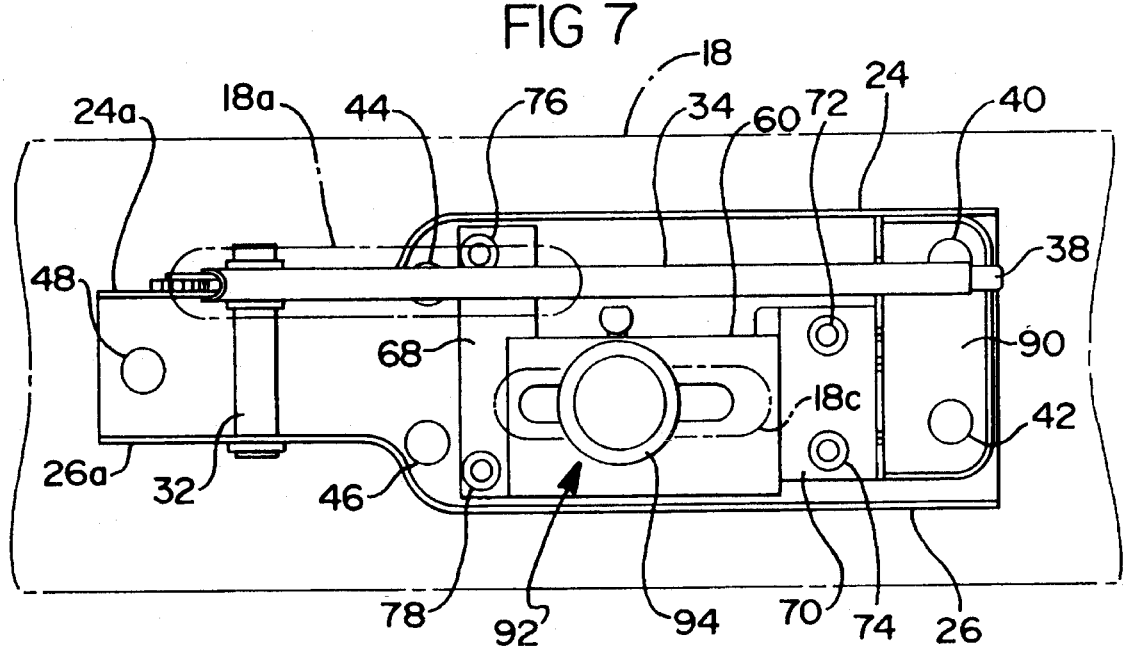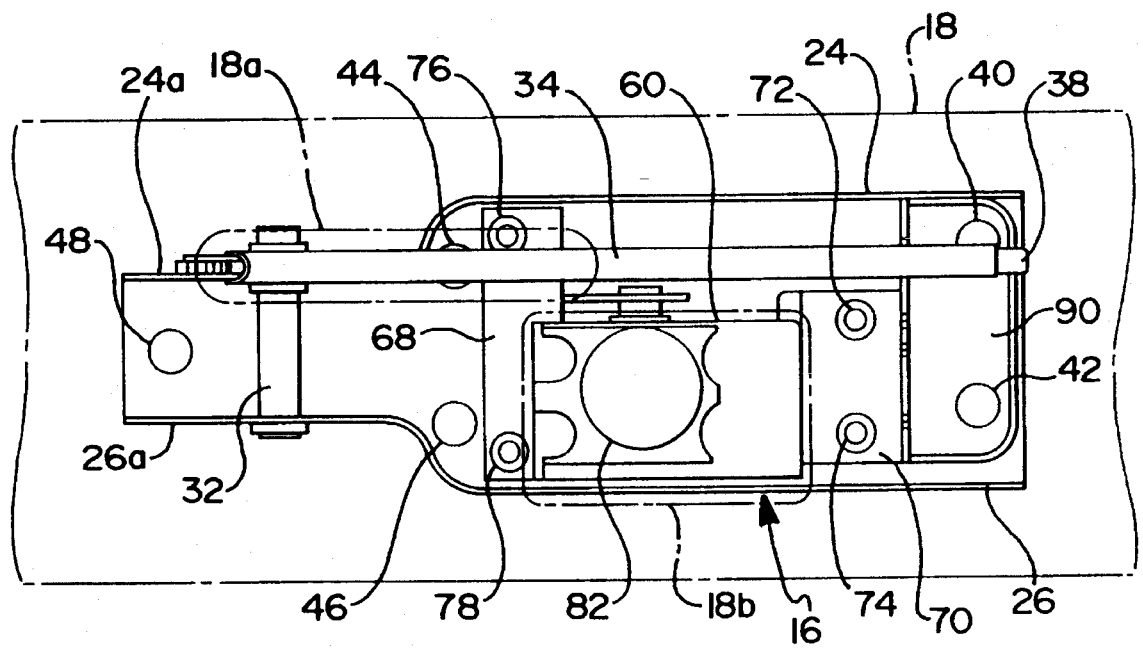

COMMON SHIFTER AND PARKING BRAKE MOUNTING

BACKGROUND OF THE INVENTION

This invention relates generally to automotive vehicles having a console-mounted transmission shifter and a floor-mounted hand-operated parking brake and, more particularly, to a common console mounting for the transmission shifter and parking brake.

All automotive vehicles incorporate a parking brake. In some vehicles the parking brake is foot operated by a lever mounted to the left of the steering wheel beneath the instrument panel. In other vehicles, usually those with bucket seats, the parking brake is operated by a hand lever mounted to the right of the driver's seat on the vehicle floorboard. Both foot-operated and hand-operated actuators can optionally incorporate a slack take-up feature.

All such vehicles also have a transmission shift lever for operating an automatic or manual transmission. Some automatic transmission shift levers are mounted on the vehicle's steering column, especially if the vehicle is equipped with bench seats. In other vehicles, the automatic transmission shift lever is centrally mounted in a console located between the driver's seat and the front passenger's seat. In most vehicles equipped with a manual transmission, the driver's and the front seat passenger's seats are split, and the transmission shift lever is mounted between the seats, frequently in a console.

For a variety of reasons, today's vehicles are much more compact than previously and ergonomics of all controls are important. For drivers' convenience, it is desirable to mount the parking brake actuator operating lever alongside the gearshift operating lever to allow a rapid sequential operation of both controls. This is particularly important in Europe, where it is customary to apply the parking brake whenever the vehicle is stopped, such as at a stop sign or traffic light.

In many vehicles, both the transmission shifter and the parking brake actuator are console-mounted. This console usually has a single decorative cover housing that is fitted over both the parking brake actuator and the transmission shifter levers, which project through openings in the housing. For cosmetic reasons, to mask the mechanisms, these openings are no larger than necessary to enable full operation of both levers.

In conventional practice the transmission shifter and the parking brake actuator are separately mounted to the vehicle structure, usually the floorboard. Since application and release of the parking brake involves substantial forces, the parking brake actuator is normally hard mounted to the vehicle structure. In contrast, the transmission shifter is usually soft mounted to the vehicle structure to isolate the passenger compartment from engine vibrations. Also, many vehicles having a console-mounted handbrake offer the option of a manual or automatic transmission, which can require different mountings for each.

The shifter and the parking brake actuator occupy a varying spatial relationship when installed. This is caused by their separate mountings, and results from dimensional tolerances, manufacturing variations, and assembly build variances. As a result, both operating levers rarely are perfectly aligned with their cover housing openings upon assembly. Curing this misfit requires a reworking of any or all of the shifter, parking brake actuator or console housing mountings if there is sufficient misalignment. Such reworking must be accomplished off-line, is expensive and time-consuming, and severely impacts vehicle assembly efficiency.

It would be desirable to provide a mounting for a transmission shifter and a parking brake actuator in a console which provides a fixed spatial relationship of the shifter and actuator to assure alignment of their operating levers with openings in a cover housing.

It would also be desirable to provide a common console mounting bracket for both a parking brake actuator and a transmission shifter which enables both hard mounting of the parking brake actuator and soft mounting of the shifter.

It would be further desirable to provide a common console mounting bracket for a parking brake actuator and a transmission shifter which enables the optional use with either manual or automatic shifters and with parking brake actuators which do and do not incorporate a slack take-up feature.

SUMMARY OF THE INVENTION

It is therefore an object of this invention to provide a mounting for a transmission shifter and a parking brake actuator in a console which provides a fixed spatial relationship of the shifter and actuator to assure alignment of their operating levers with openings in a cover housing.

Another object of this invention is to provide a common console mounting bracket for both a parking brake actuator and a transmission shifter which enables both hard mounting of the parking brake actuator and soft mounting of the shifter.

A further object of this invention is to provide a common console mounting bracket for a parking brake actuator and a transmission shifter which enables the optional use with either manual or automatic shifters and with parking brake actuators which do and do not incorporate a slack take-up feature.

In one aspect, this invention features a mounting bracket assembly for mounting both a transmission shifter and a parking brake actuator to the vehicle structure. The bracket comprises an elongated member which incorporates means for mounting the parking brake actuator thereto and mounting holes for mounting the elongated member to the structure. Fastening means secure the shifter to the elongated member and include resilient means providing a soft mounting of the shifter to the vehicle floorboard.

In another aspect, this invention features a mounting bracket assembly for mounting both a transmission shifter and a parking brake actuator, each having an operating lever, to a vehicle floorboard. The bracket assembly comprises an elongated base plate having mounting holes for mounting the base plate longitudinally of the vehicle to the floorboard and incorporates means for mounting the parking brake actuator thereto with its operating lever extending longitudinally of the vehicle. An elevated structure mounts the transmission shifter and includes legs incorporating four mounting pads. Cooperating mounting pads are formed on the base plate and interfit vertically with the leg mounting pads to locate the transmission shifter on the base plate with its operating lever beside the parking brake actuator operating lever. Fastening means which mount the elevated structure on the base plate include resilient pads interposed between the leg and base plate mounting pads to secure the elevated structure to the base plate and provide a soft mounting of the shifter to the vehicle floorboard.

Preferably, the resilient pads are rubber and the fastening means include means bonding the rubber pads to the leg and base plate mounting pads.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a perspective view of an assembly of a transmission shifter and a parking brake actuator mounted on a mounting bracket assembly, according to this invention;

FIG. 2 is an enlarged sectional view of detail "A" of FIG. 3, illustrating a transmission mounting pad;

FIG. 6 is a plan view of the assembly of FIG. 1; and

FIG. 7 is a view similar to FIG. 6, but illustrating another embodiment of this invention.

DETAILED DESCRIPTION OF A PREFERRED EMBODIMENT

Figure 3:
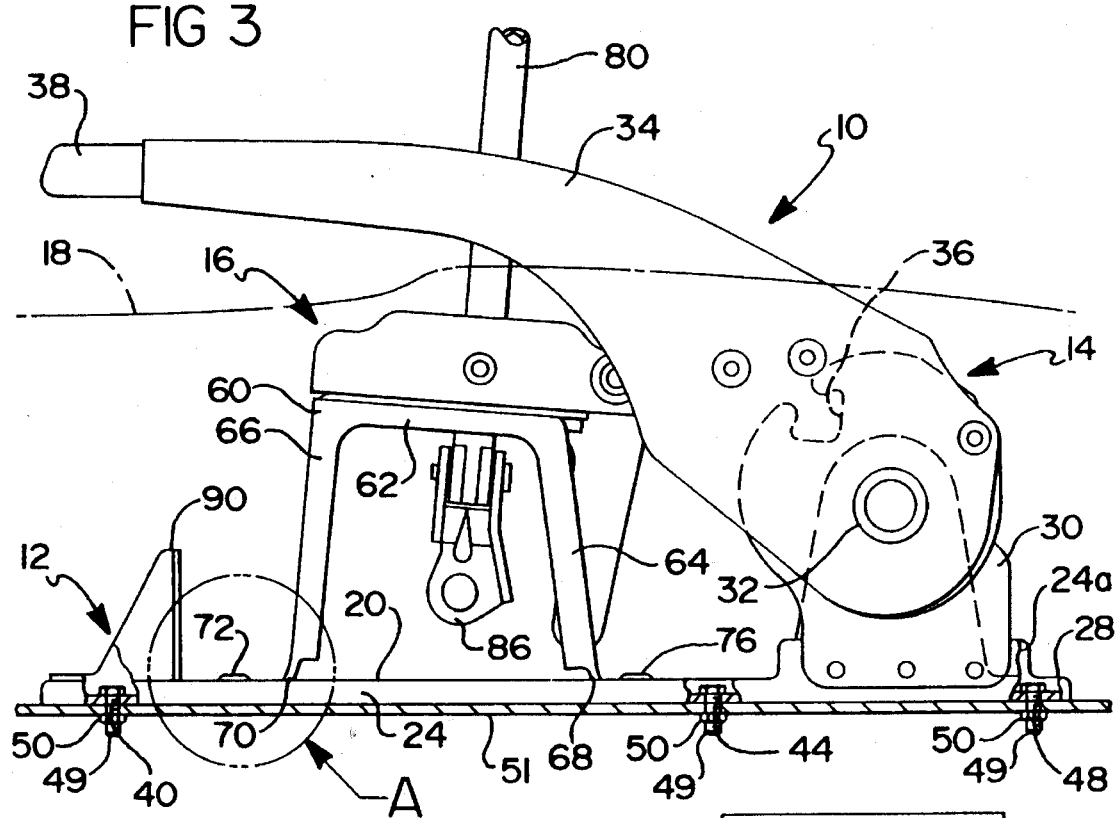
FIG. 3 is a side elevation of the assembly of FIG. 1.
Figure 4:
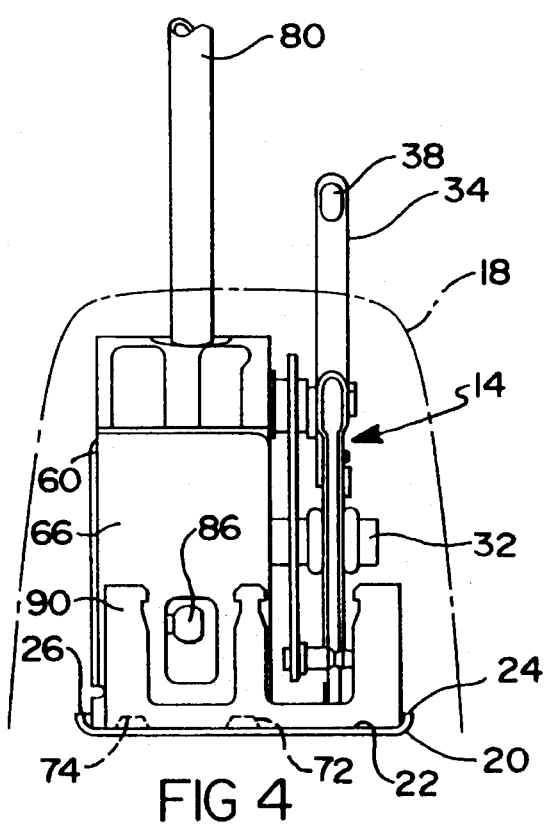
FIG. 4 is an end elevation of the assembly of FIG. 1.

Referring now to the drawings, FIGS. 1 and 3 depict a vehicle shifter console 10 configured for conventional mounting to a vehicle floorboard between the driver's seat and the front passenger's seat, not illustrated. Console 10 includes a mounting bracket assembly 12 which mounts a hand-operated parking brake actuator 14 and a transmission shifter assembly 16. A decorative cover housing 18 having top openings 18a and 18b, shown in phantom lines in FIG. 6, may be placed over console 10 after installation in a vehicle.

Mounting bracket assembly 12 comprises an elongated steel base plate 20 having a flat floor 22 bordered by upturned side flanges 24 and 26. A rear extension 28 includes upward side flange extensions 24a and 26a. A parking brake actuator base plate 30 is riveted or welded to flange extension 24a and mounts one end of a pivot spindle 32. The other end of pivot spindle 32 is carried by flange extension 26a, as shown in FIG. 1.

An operating handle 34 is pivotally mounted on spindle 32 and conventionally mounts one end of a brake-connected cable (not shown). Handle 34 mounts a conventional pawl (not shown) that cooperates with a conventional sector (not shown) mounted in slot 36 in base plate 30 to maintain handle 34 in brake-applied position. Handle 34 also carries a release button 38 for disengaging the pawl from the sector to release the parking brake. This operation is conventional and is illustrated U.S. Pat. No. 4,515,036 to Dotson. Parking brake actuator 14 can be of the fixed or variable ratio and can incorporate a self-adjusting feature, as in the Dotson patent.

Figure 5:
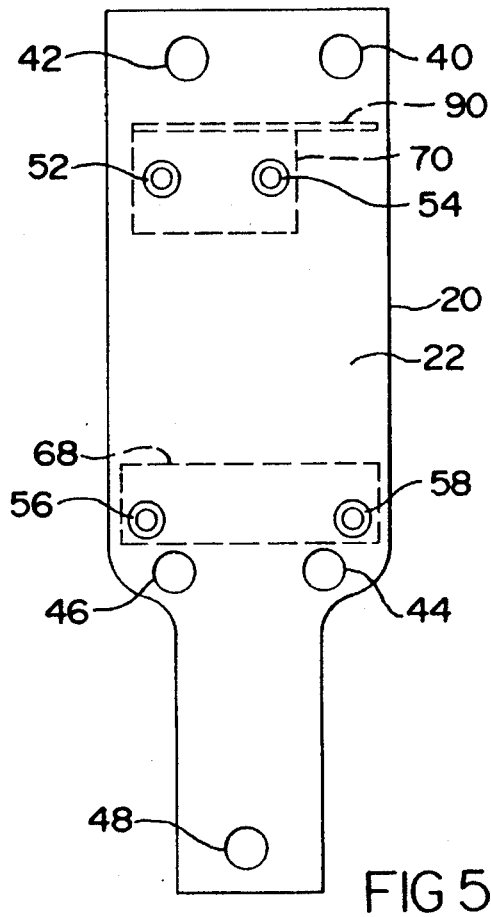
FIG. 5 is a bottom view of the assembly of FIG. 1.

As illustrated in FIGS. 3 and 5, bracket base plate floor 22 incorporates four spaced mounting holes 40, 42, 44 and 46, and rear extension 28 includes a mounting hole 48. Mounting holes 40, 42, 44, 46 and 48 receive bolts 49 which cooperate with nuts 50 to hard mount console 10 to a vehicle floorboard 51. This hard mounting provides a secure mounting for parking brake actuator 14. Bracket floor 22 includes four spaced frusto-conical projections 52, 54, 56 and 58, best seen in FIGS. 2 and 5. Projections 52, 54, 56 and 58 are stamped or otherwise displaced from floor 22 and form mounting pads for shifter 16, as will now be described.

Shifter 16 is mounted on an elevated structure or bracket 60. Bracket 60 is a steel stamping formed generally in the shape of an inverted "U", having a base 62 connecting two spaced legs 64 and 66. Legs 64 and 66 terminate in flanges 68 and 70 which incorporate four space upward projections 72, 74, 76 and 78. Projections 72, 74, 76 and 78 are frusto-conical in shape and are stamped or otherwise displaced upwardly from flanges 68 and 70.

Projections 72, 74, 76 and 78 form mounting pads which mate and interfit with base plate mounting pads 52, 54, 56 and 58 to mount and locate shifter 16 on mounting bracket 12. FIG. 2 depicts one pair 52 and 72 of the four pairs of mated, interfitting pairs of mounting pads 52 and 72, 54 and 74, 56 and 76, and 58 and 78 and is typical of all. Each of the pairs of interfitting mounting pad pairs is spaced from and interconnected by identical interposed rubber pads 79. These pads 79 are bonded to both mounting pads of a pair through a well-known bonding process.

When so bonded, pads 79 function to soft mount shifter 16 on mounting bracket 12. In this manner, shifter console 10 hard mounts parking brake actuator 14 to vehicle floorboard 51, while simultaneously soft mounting shifter 16 on the vehicle floorboard 51. The interfitting frustoconical mounting pad pairs, in conjunction to parking brake actuator mounting flanges 24a, 26a, accurately locate shifter 16 on mounting bracket base plate 20 in predictably repeatable relationship to parking brake actuator 14.

Shifter 16 is a ball-type manual transmission shifter of the type more fully disclosed in U.S. Pat. No. 4,693,135 to LaRocca et al. Shifter 16 includes an operating lever 80 having a control knob 82 which incorporates a reverse lockout release button 84. Lever 80 mounts a depending linkage 86 which mounts one end of a shifter control cable (not shown), which extends through an aperture 88 in leg 66. A cable sheath mounting plate 90 is mounted forwardly of shifter 16 on base plate 20.

Mounting bracket 20 is configured so that an automatic transmission shifter 92, having an operating lever 94, can be mounted in place of manual shifter 16, as illustrated in FIG. 7. Here, housing cover 18 has a narrower transmission lever top opening 18c. As previously noted, base plate flanges 24a and 26a are spaced to allow alternative mounting of a parking brake actuator which incorporates a slack adjustment feature.

Thus, the mounting bracket assembly of this invention mounts the parking brake actuator operating lever alongside the gearshift operating lever to allow a rapid sequential operation of both controls. While only a preferred and an alternate embodiment have been illustrated and described, obvious modifications thereof are contemplated within the scope of this invention and the following claims.

We claim:

1. The combination of a transmission shifter, a parking brake actuator, and a mounting bracket assembly for mounting both the transmission shifter and the parking brake actuator to a vehicle structure characterized by the mounting bracket assembly comprising an elongated member incorporating means for mounting the parking brake actuator thereto and mounting holes for mounting the elongated member to the structure, and fastening means securing the shifter to the elongated member and including resilient means comprising spaced resilient pads interposed between the shifter and the elongated member and bonded to both, thereby providing a soft mounting of the shifter to the mounting bracket assembly and to the vehicle structure.

2. The combination of claim 1, wherein the elongated member has at least three spaced projections, the shifter mounts mating depressions receiving the projections, and the resilient pads are interposed between the depressions and the projections, thereby soft mounting the shifter on the base plate and positively locating the shifter relative to the base plate.

3. The combination of a transmission shifter, a parking brake actuator, and a mounting bracket assembly for mounting both the transmission shifter and the parking brake actuator to a vehicle floorboard, comprising an elongated base plate incorporating means for mounting the parking brake actuator thereto and mounting holes for mounting the base plate to the floorboard, an elevated structure mounting the transmission shifter including at least three spaced shifter mounting pads, and fastening means securing the elevated structure to the base plate and including resilient means comprising resilient pads interposed between the mounting pads and the base plate and bonded to both, thereby providing a soft mounting of the shifter to the vehicle floorboard.

4. The combination of claim 3, wherein the base plate has at least three spaced integral mounting pads projecting upward from the base plate interfitting with the shifter mounting pads and the resilient pads are interposed between the interfitting mounting pads, thereby soft mounting the shifter on the base plate and positively locating the shifter relative to the base plate.

5. The combination of claim 3, wherein the elevated means includes four spaced mounting pads, and the elongated base plate includes interfitting mounting pads, and the resilient means comprise resilient pads interposed between the interfitting mounting pads and bonded to both thereby soft mounting the shifter on the base plate and positively locating the shifter relative to the base plate.

6. The combination of a transmission shifter, a parking brake actuator, and a mounting bracket assembly for mounting both the transmission shifter and the parking brake actuator, each having an operating lever, to a vehicle floorboard, comprising an elongated base plate having mounting holes for mounting the base plate longitudinally of the vehicle to the floorboard and incorporating means for mounting the parking brake actuator thereto with its operating lever extending longitudinally of the vehicle, an elevated structure mounting the transmission shifter including legs incorporating four mounting pads, cooperating mounting pads formed on the base plate interfitting vertically with the leg mounting pads to locate the transmission shifter on the base plate with its operating lever beside the parking brake actuator operating lever, and fastening means mounting the elevated structure on the base plate including resilient pads interposed between the leg and base plate mounting pads to secure the elevated structure to the base plate and provide a soft mounting of the shifter to the vehicle floorboard.

7. The combination of claim 6, wherein the base plate parking brake actuator mounting means comprise upstanding flanges for mounting the parking brake actuator.

8. The combination of claim 6 wherein the resilient pads are rubber and the fastening means include means bonding the rubber pads to the leg and base plate mounting pads.

\* \* \* \* \*